United States Patent Office 3,351,555
Patented Nov. 7, 1967

3,351,555
CHROMIC ACID-SULFURIC ACID SOLUTIONS CONTAINING A MERCURIC ION CATALYST FOR DISSOLVING OF COPPER AND ITS ALLOYS
Robert D. Byers, Onondaga, and John G. Poor, Otisco, N.Y., assignors to Allied Chemical Corporation, New York, N.Y., a corporation of New York
No Drawing. Filed Oct. 21, 1965, Ser. No. 500,220
12 Claims. (Cl. 252—79.2)

This invention relates to aqueous chromic acid-sulfuric acid solutions, and more particularly to new and improved chromic acid-sulfuric acid solutions adapted to dissolve metals at high rates.

Dilute aqueous solutions containing chromic and sulfuric acids are well known to be useful for treating or dissolving metals and their oxides in a variety of applications such as pickling, chemical polishing, bright dipping, chemical milling, and etching. In such applications the rate of dissolution of the metal is an important factor in the efficiency of the solution. Hence, it can be appreciated that even a minor improvement of 5–10% in dissolution rate represents a significant increase in the amount of metal dissolved in a given time period and correspondingly a substantial saving in cost of operation. Overall, the art relating to the dissolution of metals which chromic acid-sulfuric acid solutions has advanced to the stage where high dissolution rates make further improvements less common and more difficult to realize.

An object of the present invention is to provide a new and improved chromic acid-sulfuric acid solution for treating of metals.

Another object of the invention is to provide a chromic acid-sulfuric acid solution for treating of metals at high rates.

A further object of the invention is to provide a chromic acid-sulfuric acid solution for controlled dissolution of metals at an improved and faster rate.

Other objects and advantages will be evident from the following description of the invention.

In accordance with the present invention it has been found that minor amounts of mercury ions have a catalytic effect upon the rate at which metals are dissolved by aqueous chromic acid-sulfuric acid solutions. It has also been found that a further substantial improvement in the dissolution rate of the chromic acid-sulfuric acid solutions is realized by incorporating in these solutions a minor amount of silver ions in combination with the mercury ions. The present invention is especially beneficial in that the catalytic effect of the mercury ions, with or without silver ions, may be realized in chromic acid-sulfuric acid solutions containing other catalytic additives, particularly chloride ions, and the solutions containing the metal ions and chloride ions are effective in dissolving metals at especially fast rates. An additional feature of the invention is that it may be applied to etching of metals, particularly electrodeposited copper, as in the manufacture of printed circuit boards.

The mercury catalyst may be incorporated in the aqueous chromic acid-sulfuric acid solutions in any suitable form to supply free or dissociated ions. The mercury ions are preferably incorporated in the solutions by adding mercuric chloride. Other suitable vehicles for introducing the mercury ions include mercuric sulfate and mercuric nitrate. Only minor and even trace amounts of the mercury ions are effective in catalyzing the rate of dissolution by the dichromate-sulfuric acid solutions. Hence, as evident from Example 1, below, only 0.05 gram per liter of mercury chloride almost doubles the rate of dissolution over solutions not containing the additive. The exact amount of mercury ion introduced into the solutions is not particularly critical so long as it is a minor amount. As a practical matter the amount of mercury is limited to about 0.2 gram per liter expressed as mercuric chloride as substantially excess amounts tend to leave silvery deposits of mercury on the workpiece which requires cleaning to obtain good surfacing. Generally, the amount of mercury ion incorporated in the solutions is between about 0.005 to 0.05 gram per liter expressed as mercuric chloride, more preferably about 0.02 gram per liter. In a preferred embodiment of the invention the catalyst is a combination of silver ions and the mercury ions. The overall effect of such combination is of interest as dissolution rates are increased above the rates obtained with either additive. The silver ions may be also incorporated in the solutions in any form suitable to form yield free or dissociated silver ions. The preferred vehicle for introducing the silver ions is silver nitrate. Other suitable materials include silver sulfate. Very minor amounts of silver ion are effective in improving dissolution in combination with the mercury ion. Hence, as evident from Example 3, below, the addition of only 0.1 gram per liter of silver nitrate to a solution containing chloride as well as mercury ions improves the dissolution rate over a similar solution (Example 2, below) not containing said silver ions despite the fact that large amounts of silver are taken up in forming insoluble silver chloride. As a general proportion it is preferred to add the silver ion in an amount between about 0.02 to 0.2 gram per liter expressed as silver nitrate. Higher amounts upwards of 0.5 gram per liter are less practical as causing the deposit of a black coating on the treated metal surface which requires cleaning to obtain good surfacing. The upper limit of the total amount of mercury and silver additives is generally controlled by economic factors and practical considerations. Increasing amounts of the additives result in little improvement in rate of dissolution and as a practical matter the total amount of such additives will not exceed about 1.0 gram per liter of the solution. The larger amounts of additives also tend to roughen the surface of the treated metal and where surface quality is a factor in the product the total amount of silver and mercury ions is preferably limited to not in excess of about 0.3 gram per liter. Both the mercury and the silver ions are effective in the presence of chloride ion despite the tendency of the metal ions to form insoluble or only partially soluble salts. Chloride ions may therefore be added and when incorporated the solutions will preferably contain a specially limited amount of chloride ion between about 0.2 to 0.9 gram per liter expressed as sodium chloride as such chloride concentration has been found to give optimum dissolution rates, as described in our co-filed application, Serial No. 499,874, filed October 21, 1965.

Preparation of the chromic acid-sulfuric acid solutions of the invention involves no special procedures and the reactants and additives may be simply dissolved in water at any convenient temperature such as room temperature. As is well known the chromic acid component referred to in identifying the chromic acid-sulfuric acid solutions is essentially a source of hexavalent chromium and may be incorporated in the solutions in various forms supplying or yielding the hexavalent chromium. Hence, the chromic acid may be introduced in its normally solid anhydrous form as chromium trioxide ($CrO_3$) which, in accordance with customary and accepted practice, is the basis on which concentrations of chromic acid herein referred to are expressed. The chromic acid component may be also introduced as a water soluble metal chromate such as sodium dichromate which in the presence of sulfuric acid is equivalent to 2 moles of chromic acid. Generally, the alkali metal dichromates are the preferred form of introducing the chromic acid because of availability at substantially less cost than chromium trioxide. The more preferred vehicle is the sodium dichromate. Other soluble dichromates may be used. Ammonium dichromate is also effective in the presence of chloride ion.

The present invention is generally applicable to any chromic acid-sulfuric acid solution of a type suitable for treating or dissolving metals. Such solutions may have widely varying concentrations of chromic acid and sulfuric acid and contain such acids in widely varying proportions depending largely on the particular application or purpose of treatment. Generally, the dissolution rate, capacity and surface finish obtained from any given solution will vary depending upon the concentration and proportions of the acids, and such variables in turn are adjusted to give the more desired set of conditions for the particular application, as is known. The present invention is advantageous in beneficially improving the chromic acid-sulfuric acid solution of varying concentrations and proportions. In chemical milling, etching or other applications in which substantial dissolution of metal is desired, the concentration of chromic acid is generally between about 70 to 170 grams per liter expressed as chromium trioxide ($CrO_3$), preferably between about 90 to 150 grams per liter. In such solutions the concentration of sulfuric acid is generally within the range of about 150 to 400 grams per liter, more usually between about 200 to 350 grams per liter. In the solutions adapted for substantial metal dissolution at high rates the weight ratio of chromic acid to sulfuric acid is generally between about 1:1.6 to 1:3.7 with best results obtained in those solutions in which the ratio of chromic acid to sulfuric acid is between about 1:1.8 to 1:3.2. Solutions containing lower or reduced concentrations of the acids exhibit high initial dissolution rates and high capacity. Increasing the concentration of the acids, particularly while effecting a decrease in the ratio of chromic acid to sulfuric acid, results in solutions which have slow dissolution rates and yield poor surface quality when prepared without addition of a catalyst. Upon addition of the metal ion to these solutions the dissolution rate is markedly increased and the quality of the treated surface also substantially improved.

The procedure and conditions for carrying out the present invention may be as conventionally employed with chromic acid-sulfuric acid solutions. Generally, the metal or workpiece is immersed in the solution and the treatment carried out with agitation of the solution or workpiece. Spraying of the solution on the workpiece is also a known procedure for effecting dissolution of metals. Solution temperatures may vary over a fairly wide range. Generally, the rate of dissolution increases with increasing solution temperature. In etching and other applications where dissolution rates are of primary importance the operating solution temperatures are generally within the range of about 35–80° C., preferably 40–65° C.

A number of metals are well known to be subject to treatment and dissolution by chromic acid-sulfuric acid solutions. Specific examples of such metals include copper, magnesium, zinc and alloys thereof. Brass is an example of an alloy commonly treated with the solutions. A particular advantage of the invention is that the catalyst solutions are effective in dissolving relatively pure electrodeposited copper and are further useful in etching of such copper as in manufacture of printed circuit boards.

The following examples illustrate the practice and advantages of the present invention.

In the following examples copper specimens are treated with various chromic acid-sulfuric acid solutions and the dissolution rate recorded by determining the weight loss of the specimen over a given period of time. The copper specimens employed were tubular specimens having electrolytic copper applied over a hard drawn, Type L copper tubing. The copper tubing was copper plated in a conventional fluoborate bath having a pH of pH 0.8–1.7 and containing copper fluoborate, $Cu(BF_4)_2$, in an amount of 225 grams per liter. The plating was carried out at about room temperature and at 20 a.s.f. The copper deposited on the tubing was 25–30 mils in thickness. The dissolution characteristics of such electrodeposited copper are similar to those of the copper typically employed in etched printed circuit boards. The specimens had an outside diameter measuring about 1⅛ inch and length of 2 inches. Each specimen was supported during dissolution by clamping a circular plastic flange over the open ends of the tube so that only the electrodeposited copper was subjected to the bath. Each specimen was immersed in a 500 ml. capacity tall form beaker containing 400 ml. of the solution. The specimen was totally immersed in the solution and agitated through a reciprocating stroke of 1½ inches at a rate of 36 cycles per minute. The specimens were treated at a temperature at 120° F. which was maintained by immersing the beaker in a water bath. All runs were run in duplicate and the results given in the examples represent the average dissolution rates obtained. Finish of the treated surface is of interest in many applications and is evaluated in the following examples according to an arbitrary rating system in which a rating of 0 indicates a surface of maximum roughness, a rating of 1 indicates a surface which is rough with some tendency toward smoothing, a rating of 2 indicates a surface which is still somewhat rough and/or badly discolored, a rating of 3 indicates a surface which is almost smooth and/or only somewhat discolored, and a rating of 4 indicates a surface which is smooth but dull.

EXAMPLE 1

Chromic acid-sulfuric acid solutions were prepared by dissolving in water 190 grams per liter of sodium dichromate dihydrate and 290 grams per liter of sulfuric acid. A control solution A containing no additive was found to dissolve only 9.0 grams of copper during the first hour in contact with the copper specimen and gave a treated surface having a finish rating of 0. The same solution modified by addition of only 0.05 grams per liter of mercuric chloride showed a markedly improved dissolution rate of 14.2 grams during the first hour and produced a copper treated surface having a finish rating of 3.

EXAMPLE 2

Chromic acid-sulfuric acid solutions were prepared by adding sodium dicromate dihydrate and sulfuric acid to water in the same amounts employed in Example 1. In this example a control solution B contained 0.5 gram per liter of sodium chloride (in accordance with our co-filed application Serial No. 499,874) and dissolved 14.2 grams of copper during the first hour in contact with the copper specimen. The same solution as control solution B modified by addition of 0.05 gram per liter of mercuric chloride was found to dissolve copper at a rate of 14.4 grams per first hour in contact with the copper specimen. The treated copper had a surface finishing rating of 3.

EXAMPLE 3

A chromic acid-sulfuric acid solution was prepared from the same amounts of sodium dichromate dihydrate and sulfuric acid employed in the preceding examples and was modified by addition of 0.5 gram per liter of sodium chloride, 0.02 gram per liter of mercuric chloride and 0.10 gram per liter of silver nitrate. This solution was found to dissolve a high 15.4 grams of copper during the first hour to a total of 24 grams over a two hour period and gave a treated copper surface having a finish rating of 3. For purposes of comparison the control solution B of Example 2 was found to dissolve 22.3 grams over a two hour period indicating an increase of 7.5% by weight in the amount copper dissolved by the solution of this example.

EXAMPLE 4

A chromic acid-sulphuric acid solution containing the same additives as the solution of Example 3 was prepared except that the amount of dichromate and sulfuric acid was reduced by about 25% to 140 grams per liter sodium dichromate dihydrate and 215 grams per liter sulfuric acid. This solution was found to dissolve 17.1 grams of copper during the first hour and a total of 22.2 grams over a two hour period. After the dissolution the treated copper surface had a finish rating of 3.

EXAMPLE 5

In this example the amounts of dichromate and sulfuric acid are respectively decreased and increased with respect to the amounts employed in Example 3 such that the solution had incorporated therein 150 grams per liter of sodium dichromate dihydrate and 300 grams per liter of sulfuric acid. The quality and quantity of other additives (sodium chloride, mercury chloride and silver nitrate) were the same as in Example 3. The solution of this example was found to dissolve 16.0 grams of copper during the first hour and a total of 24.4 grams over a two hour period. The treated copper surface had a finish rating of 3.

EXAMPLE 6

Chromic acid-sulfuric acid solutions were prepared as in the preceding Examples 1–3 except that an equivalent amount of dichromate was incorporated in the solutions by substituting 160 grams per liter of ammonium dichromate for the 190 grams of sodium dichromate dihydrate employed in the preceding examples. A control solution C containing no additives dissolved only 4.1 grams during the first hour and a total of 10.3 grams over a two hour period. Another control solution D was similar to solution C except that 0.5 gram per liter of sodium chloride was added. This solution was found to dissolve 14.5 grams of copper during the first hour and a total of 23 grams over a two hour period. An additional solution was prepared in accordance with the invention by adding to a solution similar to control solution D, 0.02 gram per liter of mercuric chloride and 0.1 gram per liter of silver nitrate. This solution was found to dissolve a high 16 grams of copper during the first hour and a high total of 24.8 grams over a two hour period. The treated surface had a finish rating of 3.

Although certain preferred embodiments of the invention have been disclosed for purpose of illustration, it will be evident that various changes and modifications may be made therein without departing from the scope and spirit of the invention.

We claim:

1. An aqueous solution for etching copper and its oxides consisting essentially of between 70 to 170 grams per liter chromic acid and 150 to 400 grams per liter sulfuric acid and having incorporated therein a catalytic amount of mercuric ions.

2. An aqueous solution in accordance with claim 1 in which the solution has incorporated therein between about 0.005 to 0.05 gram per liter of mercuric ions expressed as mercuric chloride.

3. An aqueous solution in accordance with claim 1 in which silver ions are incorporated in combination with the mercuric ions.

4. An aqueous solution in accordance with claim 2 in which there is incorporated in combination with the mercuric ions between about 0.02 to 0.2 gram per liter of silver ions expressed as silver nitrate.

5. An aqueous solution according to claim 1 in which there is also incorporated between 0.2 to 0.9 gram per liter of chloride ions expressed as sodium chloride.

6. An aqueous solution in accordance with claim 1 in which the weight ratio of chromic acid to sulfuric acid is between about 1:1.6 to 1:3.7.

7. The method of etching copper and its alloys comprising contacting said metal with an aqueous solution consisting essentially of between 70 to 170 grams per liter chromic acid and 150 to 400 grams per liter sulfuric acid and having incorporated therein a catalytic amount of mercuric ions.

8. The method of claim 7 in which the solution has incorporated therein between about 0.005 to 0.05 gram per liter of mercuric ions expressed as mercuric chloride.

9. The method of claim 7 in which silver ions are incorporated in combination with the mercuric ions.

10. The method of claim 8 in which there is incorporated in combination with the mercuric ions between about 0.02 to 0.2 gram per liter of silver ions expressed as silver nitrate.

11. The method according to claim 7 in which there is also incorporated between 0.2 to 0.9 gram per liter of chloride ions expressed as sodium chloride.

12. The method in accordance with claim 7 in which the weight ratio of chromic acid to sulfuric acid is between about 1:1.6 to 1:3.7.

References Cited

UNITED STATES PATENTS

| | | | |
|---|---|---|---|
| 2,186,579 | 1/1940 | Dubpernell et al. | 252—792 X |
| 2,415,724 | 2/1947 | Beal | 252—79.2 X |
| 2,705,192 | 3/1955 | Faust et al. | 252—79.3 |
| 2,978,301 | 4/1961 | Margulies et al. | 156—18 X |
| 2,982,625 | 5/1961 | Saubestre | 252—79.2 |

LEON D. ROSDOL, Primary Examiner.

ALBERT T. MEYERS, Examiner.

S. E. DARDEN, Assistant Examiner.